United States Patent
Rabii et al.

(10) Patent No.: US 10,405,369 B2
(45) Date of Patent: Sep. 3, 2019

(54) SLAVE BLUETOOTH DEVICE SWITCHING BETWEEN ACTIVE BLUETOOTH CONNECTIONS WITH DIFFERENT MASTER BLUETOOTH DEVICES

(71) Applicant: Thales Avionics, Inc., Irvine, CA (US)

(72) Inventors: Khosro Rabii, San Diego, CA (US); Jean-Yves Couleaud, Mission Viejo, CA (US); Pankaj Trivedi, Los Alamitos, CA (US); Pierre Schuberth, Corona del Mar, CA (US); Terence Lei, Diamond Bar, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 16/182,731

(22) Filed: Nov. 7, 2018

(65) Prior Publication Data
US 2019/0075611 A1   Mar. 7, 2019

Related U.S. Application Data

(63) Continuation of application No. 15/652,391, filed on Jul. 18, 2017, now Pat. No. 10,149,340.

(51) Int. Cl.
| | |
|---|---|
| *H04W 4/80* | (2018.01) |
| *B64D 11/00* | (2006.01) |
| *H04W 72/04* | (2009.01) |
| *H04W 76/15* | (2018.01) |
| *H04W 76/25* | (2018.01) |
| *H04W 76/34* | (2018.01) |

(Continued)

(52) U.S. Cl.
CPC ....... *H04W 76/15* (2018.02); *B64D 11/00151* (2014.12); *B64D 11/00153* (2014.12); *G06F 3/03543* (2013.01); *H04W 4/80* (2018.02); *H04W 72/0446* (2013.01); *H04W 76/25* (2018.02); *H04W 76/34* (2018.02); *H04W 84/18* (2013.01)

(58) Field of Classification Search
CPC ........ G08C 17/02; G08C 23/04; G08C 19/00; G08C 17/00; G08C 2201/20; G08C 2201/33; G08C 2201/40
USPC ...................................................... 340/1.1
See application file for complete search history.

(56) References Cited

U.S. PATENT DOCUMENTS

| | | | |
|---|---|---|---|
| 2003/0096576 A1 | 5/2003 | Salonidis et al. | |
| 2006/0140166 A1* | 6/2006 | Albulet ................ | G06F 1/3203 370/346 |

(Continued)

*Primary Examiner* — Mark S Blouin

(57) ABSTRACT

A slave Bluetooth device establishes first and second connections with first and second master Bluetooth devices, respectively, that each operate in a master mode. The slave Bluetooth device operates in a slave mode when communicating through any of the first and second connections. The slave Bluetooth device communicates connection parameter update request packets containing timeout values to the first and second master Bluetooth devices. The slave Bluetooth device alternates during non-overlapping time slots between at least: 1) monitoring the first connection for traffic transmitted by the first master Bluetooth device while not monitoring the second connection; and 2) monitoring the second connection for traffic transmitted by the second master Bluetooth device while not monitoring the first connection; and controls a rate at which the alternating is performed based on the first timeout value and the second timeout value.

21 Claims, 9 Drawing Sheets

(51) Int. Cl.
*H04W 84/18* (2009.01)
*G06F 3/0354* (2013.01)

(56) References Cited

U.S. PATENT DOCUMENTS

| | | | |
|---|---|---|---|
| 2007/0105548 A1 | 5/2007 | Mohan et al. | |
| 2013/0344812 A1* | 12/2013 | Dees | H04L 63/18 |
| | | | 455/41.2 |
| 2015/0289081 A1* | 10/2015 | Chen | H04W 8/005 |
| | | | 455/41.2 |
| 2016/0128117 A1* | 5/2016 | Engelien-Lopes | H04W 76/14 |
| | | | 455/41.2 |
| 2017/0223615 A1 | 8/2017 | Lee et al. | |

* cited by examiner

SLAVE BLUETOOTH DEVICE SWITCHING BETWEEN ACTIVE BLUETOOTH CONNECTIONS WITH DIFFERENT MASTER BLUETOOTH DEVICES

CROSS REFERENCE TO RELATED APPLICATION

This application claims priority as a continuation of U.S. patent application Ser. No. 15/652,391 filed on Jul. 18, 2017, the disclosure and content of which is incorporated by reference herein in its entirety.

FIELD OF THE INVENTION

The present disclosure relates to Bluetooth communication protocol devices and related interconnection of peripheral devices and a video display unit using Bluetooth communication connections.

BACKGROUND

Bluetooth Low Energy (BLE) technology provides connectivity between mobile devices and a variety of systems, e.g., video displays, remote controllers, mobile phones, computers, tablets, headphones, cars, etc. The BLE technology supports a relatively low power consumption for the mobile devices. According to the BLE technology, a first Bluetooth device ("master Bluetooth device") operating in a master mode and a second Bluetooth device ("slave Bluetooth device") operating in a slave mode establish a connection through which they can transmit and receive data using radio frequency signaling.

Many applications have arisen where there is a need to connect one BLE device to multiple BLE devices, such as to connect an entertainment system to wireless headphones and a mobile phone. Some BLE devices now include two or more separate BLE transceiver circuits to enable maintenance of simultaneous connections to a corresponding two or more other BLE devices. The incremental additional cost and design and manufacturing complexity of including more than one BLE transceiver circuit in a BLE device for these purposes can become prohibitive for some applications, such as for In-flight entertainment (IFE) systems where BLE transceiver circuits can be integrated in seat video display units (SVDUs) installed in hundreds of passenger seats onboard an aircraft.

SUMMARY

Bluetooth protocol standards and commercially available devices contemplate that any Bluetooth device that is operating in a slave mode (referred to as a "slave Bluetooth device") can have only one connection to another Bluetooth device that is operating in a master mode (referred to as a "master Bluetooth device"). Thus, if more than one simultaneous connection is desired, the slave Bluetooth device must include two or more separate Bluetooth transceiver circuits to enable simultaneous active connections to a corresponding two or more other master Bluetooth devices.

Some embodiments of the present disclosure may arise from the present realization that a slave Bluetooth device can control a single Bluetooth transceiver to sequentially establish connections to a plurality of master Bluetooth devices, and then alternate between those connections to serve communications from the master Bluetooth devices at a rate that is sufficient to prevent any of the master Bluetooth devices from erroneously determining that the slave Bluetooth device is missing and resultantly tearing down its respective connection to the slave Bluetooth device.

One example embodiment of the present disclosure is directed to a slave Bluetooth device that includes a Bluetooth transceiver, at least one processor connected to the Bluetooth transceiver, and at least one memory connected to the at least one processor and storing program code that is executed by the at least one processor to perform operations. The operations include establishing a first connection through the Bluetooth transceiver with a first master Bluetooth device that operates in a master mode. The slave Bluetooth device operates in a slave mode when communicating through the first connection. The operations further include communicating a first connection parameter update request packet containing a first timeout value through the Bluetooth transceiver and the first connection to the first master Bluetooth device, and establishing a second connection through the Bluetooth transceiver with a second master Bluetooth device that operates in a master mode. The slave Bluetooth device operates in the slave mode when communicating through the second connection. The operations further include communicating a second connection parameter update request packet containing a second timeout value through the Bluetooth transceiver and the second connection to the second master Bluetooth device. The slave Bluetooth device then alternates during non-overlapping time slots between at least: 1) monitoring the first connection for traffic transmitted by the first master Bluetooth device while not monitoring the second connection; and 2) monitoring the second connection for traffic transmitted by the second master Bluetooth device while not monitoring the first connection. A rate at which the alternating is performed is controlled based on the first timeout value and the second timeout value.

Other Bluetooth devices, video display units, systems, and corresponding methods according to embodiments of the inventive subject matter will be or become apparent to one with skill in the art upon review of the following drawings and detailed description. It is intended that all such additional Bluetooth devices, video display units, systems, and corresponding methods be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
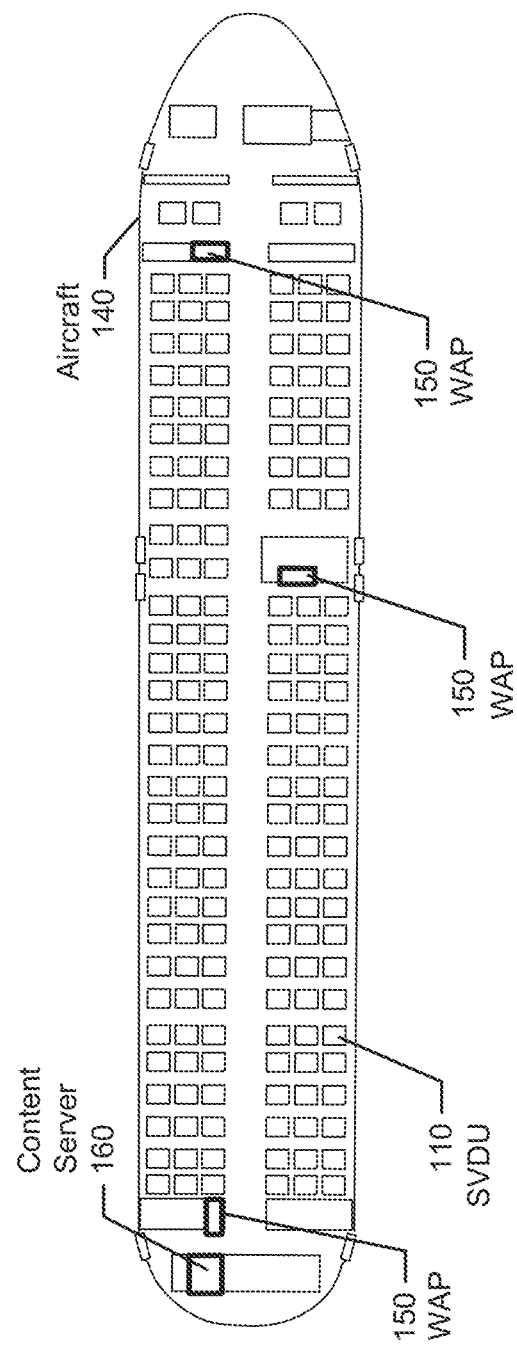
FIG. 1 illustrates an aircraft cabin containing an in-flight entertainment (IFE) system having a content server that streams electronic content through wireless access points (WAPs) to passenger equipment and/or through a wired network to seat video display units (SVDUs) that are controlled by wireless controllers, in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

The Bluetooth protocol standards and commercially available devices contemplate that any Bluetooth device that is operating in a slave mode (referred to as a "slave Bluetooth device") can have only one connection to another Bluetooth device that is operating in a master mode (referred to as a "master Bluetooth device"). Thus, if more than one simultaneous connection is desired, the slave Bluetooth device must include two or more separate Bluetooth transceiver circuits to enable simultaneous active connections to a corresponding two or more other master Bluetooth devices.

Various embodiments of the present disclosure may arise from the present realization that a slave Bluetooth device can control a single Bluetooth transceiver to sequentially establish connections to a plurality of master Bluetooth devices, and then alternate between those connections to serve communications from the master Bluetooth devices at a rate that is sufficient to prevent any of the master Bluetooth devices from erroneously determining that the slave Bluetooth device is missing (e.g., beyond communication range or powered-off) and resultantly tearing down its respective connection to the slave Bluetooth device. The slave Bluetooth device requests that each of the master Bluetooth devices use a timeout value(s) that is sufficiently large to allow the slave Bluetooth device to alternate between the simultaneously active connections to separately service communications with the master Bluetooth devices. The timeout value may be communicated by the slave Bluetooth device as a slave latency, connection interval, and/or connection supervision timeout that the master Bluetooth devices are requested to use to manage the connection to the slave Bluetooth device. A Connection Supervision Timeout value specifies the maximum time a connection peer Bluetooth device not receiving any transfer, to consider the connection lost.

These and other embodiments will be explained in further detail below in the non-limiting context of an In-flight entertainment (IFE) system that includes seat video display units (SVDUs) which each have a single Bluetooth transceiver that is operated in a slave mode to connect to other Bluetooth devices operates in a master mode. The other Bluetooth devices having Bluetooth transceivers can include, without limitation, wireless passenger control units (WPCUs), wireless mouse controllers (WMCs), passenger wireless headphones, passenger mobile phones, tablet computers, laptop computers, fitness trackers, heartrate monitors, other passenger wearables, etc. Each SVDU can be configured to be mechanically connected to a seat frame within a vehicle, such as within a seat back, an arm rest, etc. The Bluetooth transceivers are configured to transmit and receive radio frequency (RF) signals in the ISM band. Although various embodiments herein are primarily described in the context of an IFE system deployed onboard an aircraft, the invention is not limited thereto. Instead, these and other related embodiments may be used to control Bluetooth transceivers located in any type of device and for any type of system application. Various embodiments disclosed herein may be particularly advantageous for deployment in systems that include a potentially large number of Bluetooth transceivers, where unnecessary duplication of transceivers in each of the deployed devices can be prohibitively expensive and complex, such as in vehicles, including without limitation, trains, automobiles, cruise ships, and buses, and in other non-vehicle installations, including without limitation, meeting rooms, sports stadiums, etc.

Embodiments are also described in the context of the Bluetooth transceivers being configured to transmit and receive using radio resources in the ISM band. As used herein, the term "ISM band" refers to one or more frequency ranges that are reserved internationally for the use of radio frequency energy for unlicensed and/or licensed communications. The term "band" can refer to one continuous frequency range or a plurality of non-continuous frequency ranges that are defined by the ITU Radio Regulations for ISM communications.

FIG. 1 illustrates an aircraft cabin 140 containing an IFE system that provides entertainment services to passengers. The IFE system can include a content server 160 that streams and/or downloads electronic content through wired networks (e.g., Ethernet) and/or through wireless access points (WAPs) 150 to seat video display units (SVDUs) 110 that may be mounted to structures within the aircraft, including to seatbacks, seat armrests/frames, bulkheads, overhead structures, etc. The content server 160 may additionally stream and/or download electronic content through WAPs 150 to passenger equipment carried on-board by passengers, such as mobile phones, tablet computers, laptop computers, etc. The SVDUs 110 each contain a Bluetooth transceiver that wirelessly communicates through ISM band RF signaling with Bluetooth transceivers within various types of passenger controllers, which may be releasable docked to an armrest docket station and/or a docket station connected to or adjacent to some/all of the SVDUs 110. The SVDUs 110 may additionally communicate with various types devices that a passenger can bring on board the aircraft, such as wireless headphones and mobile computing devices, such as cellular phones, tablet computers, laptop computers, etc. The Bluetooth transceiver within a SVDU 110 is understood to be the communication circuitry (i.e., transceiver, signal processor, etc.) which can be incorporated within the same housing that at least partially encloses a display device, video display circuitry, network interface, and other circuitry providing functionality for the SVDU 110.

Figure 2:
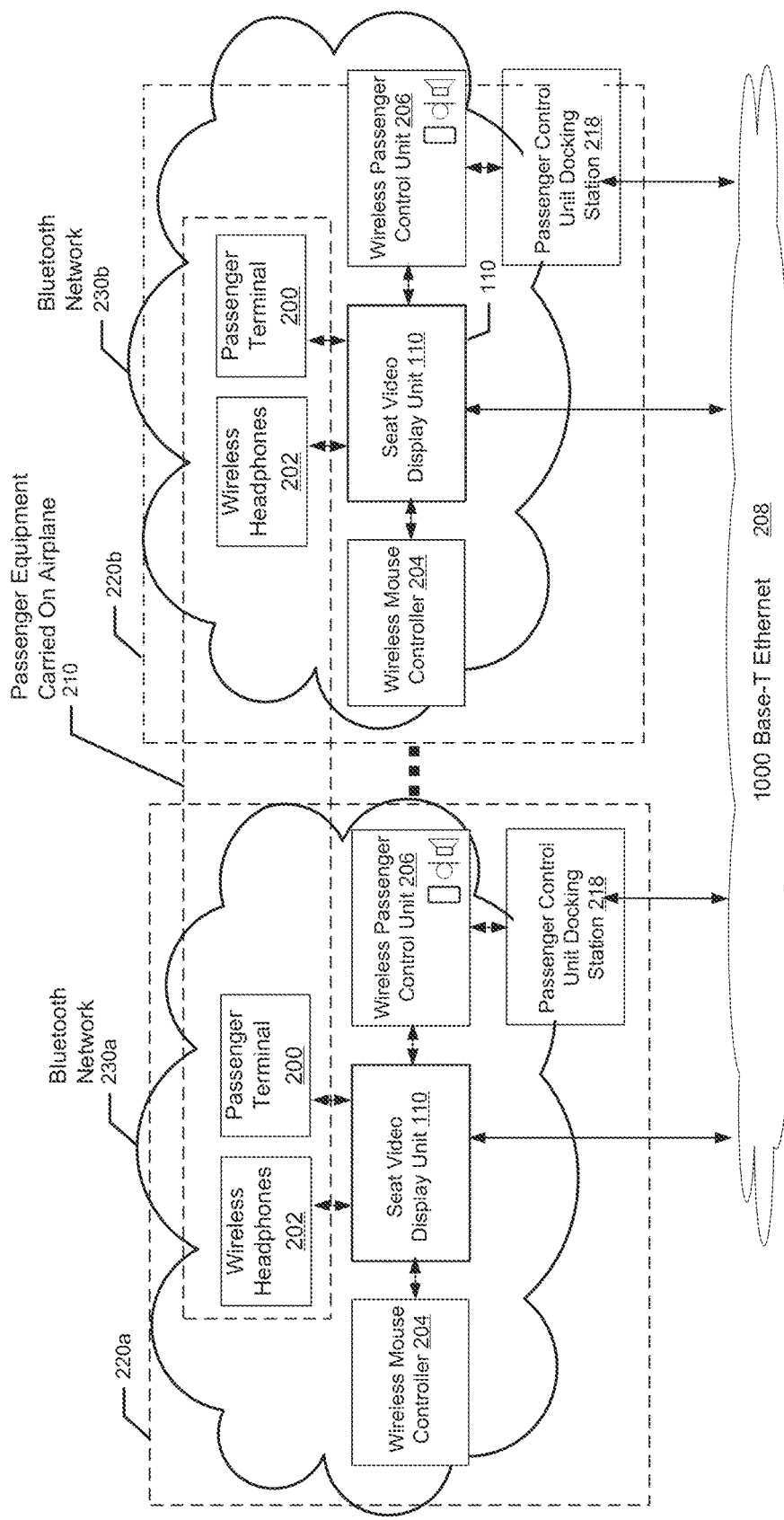
FIG. 2 is a block diagram illustrating some components of the IFE system of FIG. 1 that are configured to operate in accordance with some embodiments of the present disclosure.

FIG. 2 is a block diagram illustrating some components of the IFE system of FIG. 1 that are configured to operate in accordance with some embodiments of the present disclosure. Referring to FIG. 2, the IFE system includes system devices that can be located at each passenger seat location, and which are configured to communicate with various types of passenger equipment that can be carried on-board by passengers. The seat-located system devices can communicate using RF resources within the ISM band with the passenger equipment using an IEEE 802.11ac wireless network 204 and/or a Bluetooth wireless networks 230a,b. The example passenger equipment includes a passenger mobile terminal 200 having a Bluetooth transceiver and wireless headphones 202.

The system devices can include a SVDU 110, a wireless passenger control unit (WPCU) 206 and a wireless mouse controller (WMC) 204 that each include a Bluetooth transceiver that establishes a connection to the SVDU 110. The WPCU 206 may be docked in a PCU docking station 218 for charging and may be networked therethrough to the SVDU 110 via the backbone network 2018. The WMC 204 may be a trackpad mounted in a seat armrest or seat deployable food tray. The SVDUs 110 are connected to request and receive content from a central content server through a backbone network 208, such as 1000 base-T Ethernet. The WPCU 206 and the WMC 204 can be operated by a passenger to wirelessly control the SVDU 110, such as to select content that is consumed from the content server (e.g., played through a display device), select among displayed menu items, and control other operations of the SVDU 110.

The example SVDU 110 includes a display device, video display circuitry, a general-purpose processor, a Bluetooth transceiver, and an Ethernet interface or other wired network interface. The WPCU 206 and the WMC 204 each can include a general-purpose processor and a Bluetooth transceiver, and may include display circuitry connected to a display device, and/or audio decoding circuitry connected to a wired headphone jack. The WPCU 206 may be a handheld device that is owned by the aircraft operator and provided for temporary use by a passenger during a flight.

FIG. 2 illustrates an example configuration of components for two spaced apart seat locations 220a and 220b. Each seat location 220a/220b is illustrated as being configured to include a passenger equipment 210 that includes, but is not limited to, the passenger terminal 200 (e.g., cellular phone, laptop computer, tablet computer, etc.) and the wireless headphones 202. These per-seat component configurations can be replicated for any number of seat locations, such as being replicated for hundreds of seats to form an IFE system within an aircraft.

As will be explained in further detail below, each SVDU 110 establishes Bluetooth connections with each of the various devices, e.g., WMC 204, the WPCU 206, the wireless headphones 202, and the passenger terminal 200 to form a Bluetooth network 230a/230b.

Figure 3A:
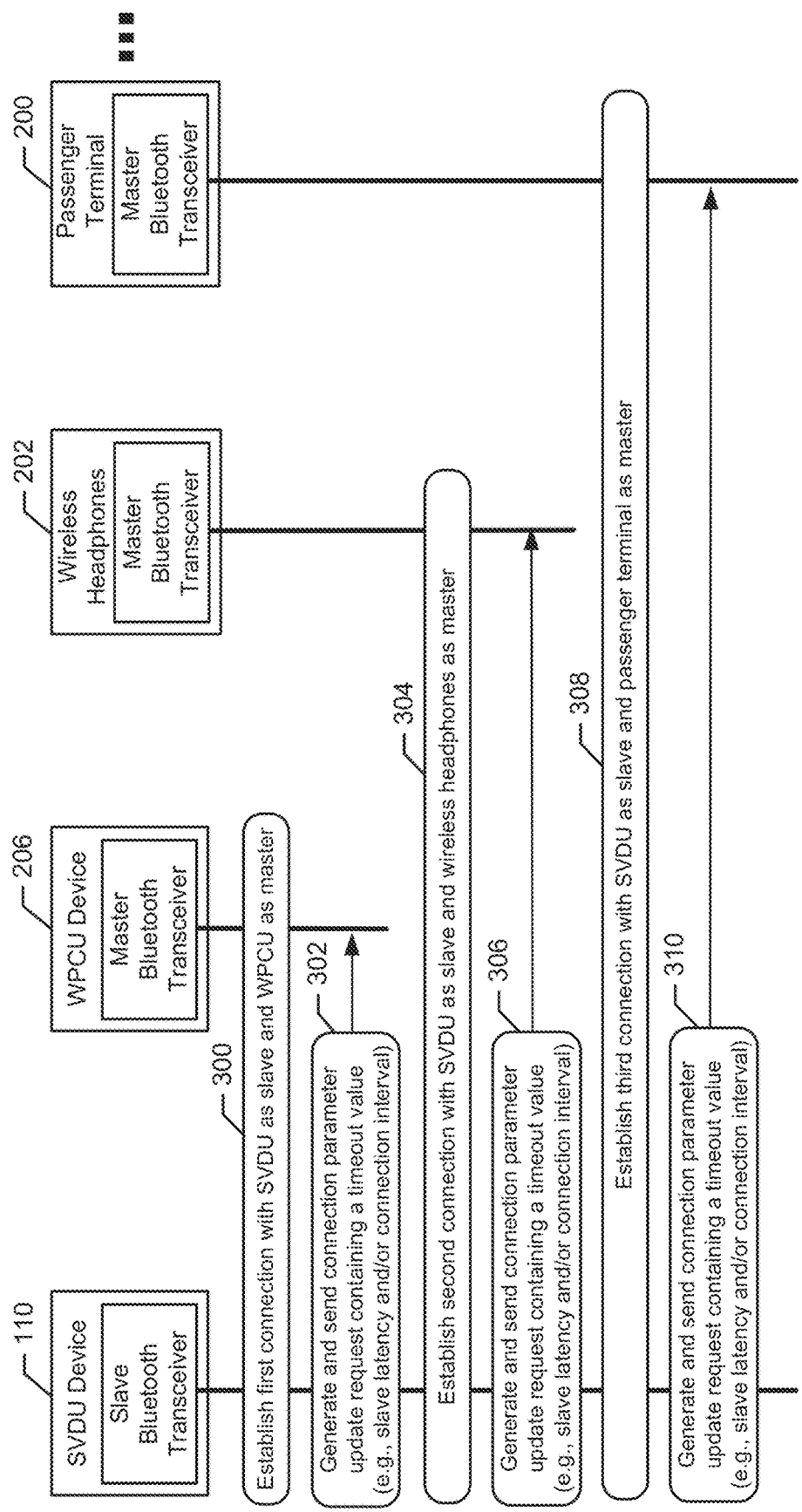
FIGS. 3A-3B are a combined block diagram and data flow diagram illustrating operations and methods for establishing connections from one SVDU device operating as a slave to a plurality of other devices operating as masters, the slave device alternating between the connections to service communications from the master devices, in accordance with some embodiments of the present disclosure.
Figure 3B:
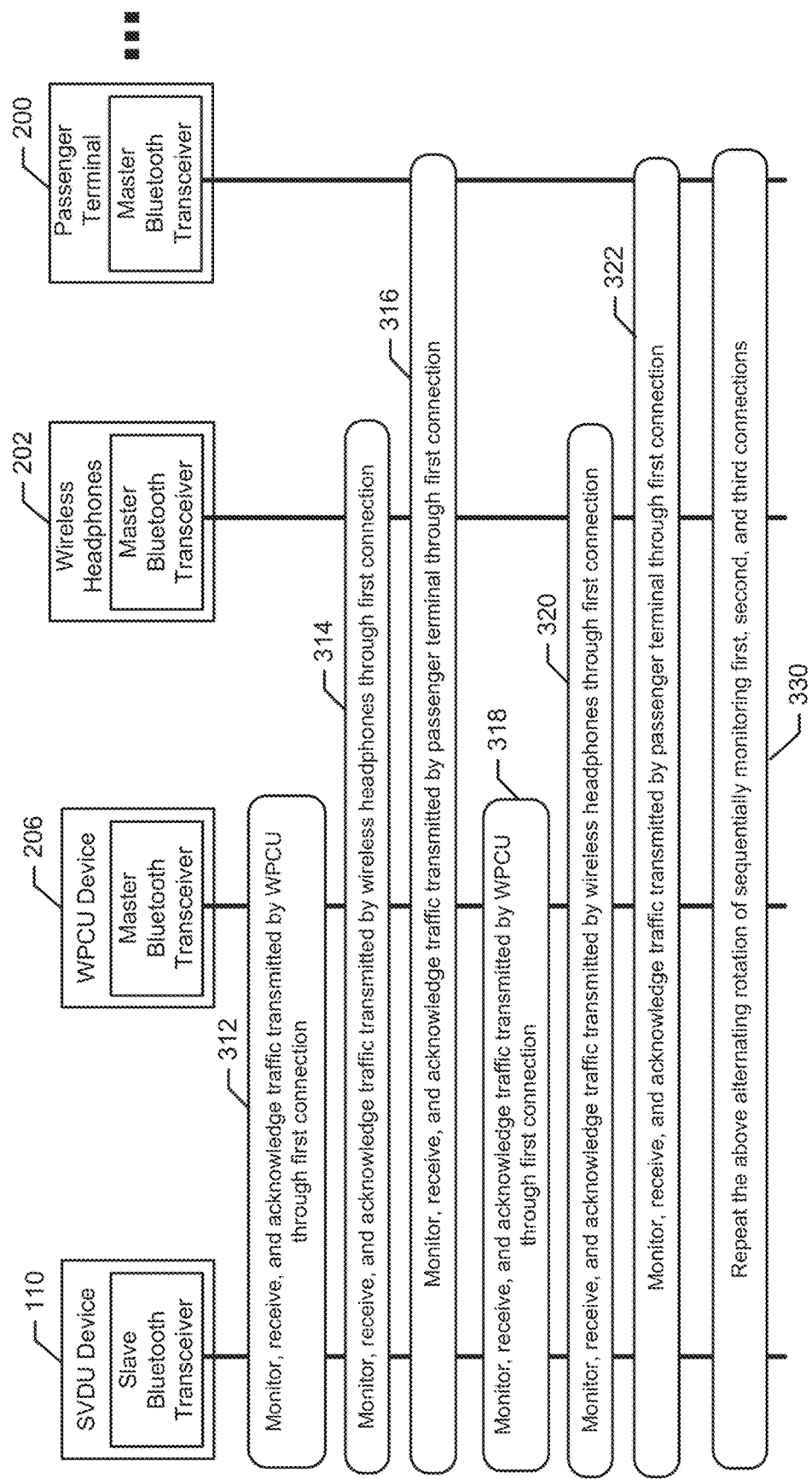

FIGS. 3A-3B are a combined block diagram and data flow diagram illustrating operations and methods for establishing connections from one SVDU device operating as a slave to a plurality of other devices operating as masters. The slave device then alternates between the connections to service communications from the master devices.

In the illustrated example, the SVDU device 110 contains a Bluetooth transceiver that is configured to operate in a slave mode when communicating through connections established to other devices. The WPCU device 206, the wireless headphones 202, and the passenger terminal 200 each contain a Bluetooth transceiver that is configured to operate in a master mode when communicating through their respective connections established to the SVDU device 110. The SVDU is therefore also referred to as a Bluetooth slave SVDU 110. Similarly, the WPCU device is also referred to as a Bluetooth master WPCU 206, the wireless headphones is also referred to as a Bluetooth master wireless headphones 202, and the passenger terminal is also referred to as a Bluetooth master passenger terminal 200.

Referring to FIG. 3A, the Bluetooth slave SVDU 110 establishes (block 300) a first connection through the Bluetooth transceiver with the Bluetooth master WPCU device 206 that operates in a master mode. The Bluetooth slave SVDU 110 operates in a slave mode when communicating through the first connection. The Bluetooth slave SVDU 110 generates and communicates (block 302) a first connection parameter update request packet containing a first timeout value through the Bluetooth transceiver and the first connection to the Bluetooth master WPCU device 206.

The Bluetooth slave SVDU 110 establishes (block 304) a second connection through the Bluetooth transceiver with the Bluetooth master wireless headphones 202 that operates in a master mode. The Bluetooth slave SVDU 110 operates in a slave mode when communicating through the second connection. The Bluetooth slave SVDU 110 generates and communicates (block 306) a second connection parameter update request packet containing a second timeout value through the Bluetooth transceiver and the second connection to the Bluetooth master wireless headphones 202.

The Bluetooth slave SVDU 110 establishes (block 308) a third connection through the Bluetooth transceiver with the Bluetooth master passenger terminal 200 that operates in a master mode. The Bluetooth slave SVDU 110 operates in a slave mode when communicating through the third connection. The Bluetooth slave SVDU 110 generates and communicates (block 310) a third connection parameter update request packet containing a third timeout value through the Bluetooth transceiver and the third connection to the Bluetooth master passenger terminal 200.

Referring to FIG. 3B which illustrates operations occurring subsequent to block 310 of FIG. 3A, the Bluetooth slave SVDU 110 alternates during non-overlapping time slots between at least: 1) monitoring the first connection for traffic transmitted by the Bluetooth master WPCU device 206 while not monitoring the second and third connections; 2) monitoring the second connection for traffic transmitted by the Bluetooth master wireless headphones 202 while not monitoring the first and third connections; and 3) monitoring the third connection for traffic transmitted by the Bluetooth master passenger terminal 200 while not monitoring the first and second connections. Although FIGS. 3A and 3B illustrate only three connections being established and serviced, the operations disclosed herein may be used to establish and the service any plural number of connections.

More specifically, the Bluetooth slave SVDU 110 during a first time slot performs operations (block 312) to monitor, receive, and acknowledge traffic that is transmitted by the Bluetooth master WPCU device 206 through the first connection. During a subsequent second time slot, which does not overlap with the first time slot, the Bluetooth slave SVDU 110 performs operations (block 314) to monitor, receive, and acknowledge traffic that is transmitted by the Bluetooth master wireless headphones 202 through the second connection. During a subsequent third time slot, which does not overlap with the first and second time slots, the Bluetooth slave SVDU 110 performs operations (block 316) to monitor, receive, and acknowledge traffic that is transmitted by the Bluetooth master passenger terminal 200 through the third connection.

The Bluetooth slave SVDU 110 then repeats the alternating servicing of the first through third connections, by during a fourth time slot, which does not overlap the first three third time slots, performing operations (block 318) to monitor, receive, and acknowledge traffic that is transmitted by the Bluetooth master WPCU device 206 through the first connection. During a subsequent fifth time slot, which does not overlap with the first through fourth time slots, the Bluetooth slave SVDU 110 performs operations (block 320) to monitor, receive, and acknowledge traffic that is transmitted by the Bluetooth master wireless headphones 202 through the second connection. During a subsequent sixth time slot, which does not overlap with the first through fifth time slots, the Bluetooth slave SVDU 110 performs operations (block 322) to monitor, receive, and acknowledge traffic that is transmitted by the Bluetooth master passenger terminal 200 through the third connection.

In this manner, the Bluetooth slave SVDU 110 continues to repeat (block 330) the above alternating rotation of sequentially monitoring, receiving, acknowledging traffic through the first, second, and third connections. The traffic can include, but is not limited to, user data, Bluetooth commands for acknowledging receipt of data from another device and/or for signaling to maintain the connection (e.g., polling requests and acknowledgement responses), instructions, etc. For example, while the Bluetooth slave SVDU 110 is monitoring the first, second, or third connection for traffic transmitted by the respective master Bluetooth device, it communicates connection polling responses through the monitored connection responsive to corresponding connection polling requests that are received through that connection.

Although FIG. 3B illustrates a sequential alternating order of the first connection, then the second connection, and then the third connection, the Bluetooth slave SVDU 110 can choose any order of alternating between the active connections. The order and frequency and which various connections are services may be determined by the Bluetooth slave SVDU 110 based on priority of traffic carried by the connection, quality of service requirements of traffic carried by the connection, requirements for signaling a corresponding master that the connection as active, etc. The Bluetooth slave SVDU 110 may be controlled to return to a connection more frequently than one or more other connections based on one or more of these considerations.

The Bluetooth slave SVDU 110 controls a rate at which the alternating, between servicing the first through third connections, is performed based on the respective first, second, and third timeout values. The rate is controlled so that the Bluetooth slave SVDU 110 returns to each of the respective first, second, and third connections with sufficient timeliness so that the associated Bluetooth master device does not erroneously determine that the Bluetooth slave SVDU 110 is missing (e.g., beyond communication range or powered-off) and resultantly tearing down its respective connection to the Bluetooth slave SVDU 110.

In one embodiment, the Bluetooth transceiver of the Bluetooth slave SVDU 110 is controlled to alternate between the connections, by operations that include: controlling the Bluetooth transceiver to cease monitoring the first connection and to resume monitoring the second connection, based on expiration of a first time slot during the monitoring of the first connection, where the first time slot is defined based on the first timeout value; controlling the Bluetooth transceiver to cease monitoring the second connection and to resume monitoring the third connection, based on expiration of a second time slot during the monitoring of the second connection, where the second time slot is defined based on the second timeout value; and controlling the Bluetooth transceiver to cease monitoring the third connection and to resume monitoring the first connection, based on expiration of a third time slot during the monitoring of the third connection, where the third time slot is defined based on the third timeout value.

In one embodiment, the first, second, and third timeout values are equal, which may correspond to the Bluetooth slave SVDU 110 each of the first, second, and third connections for a same time duration before alternating to monitor another one of the connections. In another embodiment, the Bluetooth slave SVDU 110 can be configured to monitor the first, second, and third connections for a different time durations which may be determined based on characteristics of the traffic that is expected to be sent through the respective connection, based on the time duration that the associated master device will wait before erroneously determining that the Bluetooth slave SVDU 110 is no longer accessible, and/or based on one or more other factors.

In another embodiment, the first timeout value is determined based on a maximum length of time that the Bluetooth slave SVDU 110 is allowed to remain not monitoring the first connection while it monitors the second connection or the third connection. The second timeout value is similarly determined based on a maximum length of time that the Bluetooth slave SVDU 110 is allowed to remain not monitoring the second connection while it monitors at least the first connection or the third connection. The third timeout value is similarly determined based on a maximum length of time that the Bluetooth slave SVDU 110 is allowed to remain not monitoring the third connection while it monitors at least the first connection or the second connection.

In a further embodiment, the Bluetooth slave SVDU 110 determines the first timeout value based on a rate at which traffic is expected to be transmitted through the first connection by the Bluetooth master WPCU device 206, determines the second timeout value based on a rate at which traffic is expected to be transmitted through the second connection by the Bluetooth master wireless headphones 202, and determines the third timeout value based on a rate at which traffic is expected to be transmitted through the third connection by the Bluetooth master passenger terminal 200.

The first, second, and third timeout values may be determined based on a combination of the rates at which traffic is expected to be transmitted through the first, second, and third connections by the respective master devices.

The master Bluetooth devices may operate to continuously carousel time-stamped application data through their respective connections. During carouseling, the master repetitively retransmits its application data with a fixed time-stamp. Carouseling time-stamped application data enables the Bluetooth slave SVDU needing to signal for flow control. In this manner, the SVDU can leave (stop monitoring) a connection while alternating through other connections to be monitored, and then return to the connection to receive the application data which is identified as being new to the SVDU based on the fixed time-stamp received with the application data.

Figure 4:
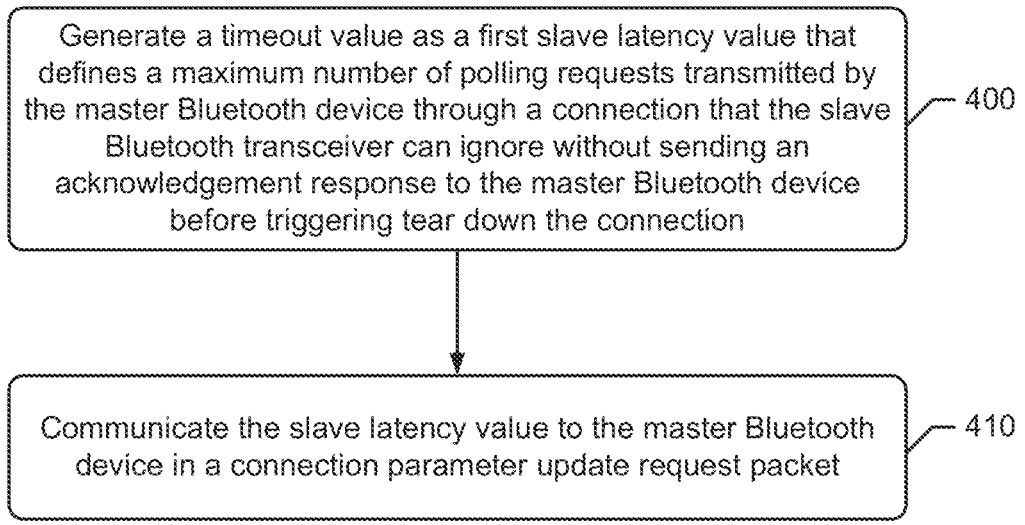
FIGS. 4-5 are flowcharts of operations and methods by the slave device to control the master devices to enable the slave device to jump between the connections to service the communications from the master devices and maintain the connections in a simultaneously active state, in accordance with some embodiments of the present disclosure.

Referring to the embodiment illustrated in FIG. 4, the Bluetooth slave SVDU 110 generates (block 400) the first timeout value as a first slave latency value that defines a maximum number of polling requests transmitted by the Bluetooth master WPCU device 206 through the first connection that the Bluetooth slave SVDU 110 can ignore without sending an acknowledgement response to the Bluetooth master WPCU device 206 before triggering the Bluetooth master WPCU device 206 to tear down the first connection. The first slave latency value is communicated (block 410) to the Bluetooth master WPCU device 206 in a connection parameter update request packet.

The operations of blocks 400 and 410 can be repeated for the other connections. More particularly, the Bluetooth slave SVDU 110 can generate the second timeout value as a second slave latency value that defines a maximum number of polling requests transmitted by the Bluetooth master wireless headphones 202 through the second connection that the Bluetooth slave SVDU 110 can ignore without sending an acknowledgement response to the Bluetooth master wireless headphones 202 before triggering the Bluetooth master wireless headphones 202 to tear down the second connection. The Bluetooth slave SVDU 110 can generate the third timeout value as a third slave latency value that defines a maximum number of polling requests transmitted by the Bluetooth master passenger terminal 200 through the third connection that the Bluetooth slave SVDU 110 can ignore without sending an acknowledgement response to the Bluetooth master passenger terminal 200 before triggering the Bluetooth master passenger terminal 200 to tear down the third connection.

In another embodiment, the Bluetooth slave SVDU 110 generates the first connection parameter update request packet to contain the first timeout value and to further contain a first connection interval value that is determined based on a maximum length of time that the Bluetooth slave SVDU 110 is allowed to remain not monitoring the first connection while it monitors the second or third connections. The second connection parameter update request packet is generated to contain the second timeout value and to further contain a second connection interval value that is determined based on a maximum length of time that the Bluetooth slave SVDU 110 is allowed to remain not monitoring the second connection while it monitors the first or third connections. The third connection parameter update request packet is generated to contain the third timeout value and to further contain a third connection interval value that is determined based on a maximum length of time that the Bluetooth slave SVDU 110 is allowed to remain not monitoring the third connection while it monitors the first or second connections.

Figure 5:
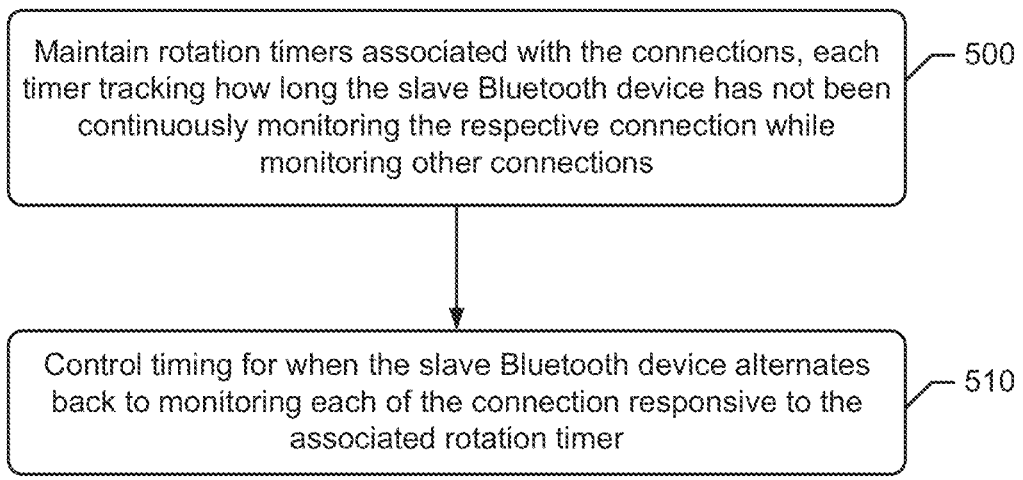

Referring to the embodiment illustrated in FIG. 5, the Bluetooth slave SVDU 110 maintains (block 500) a first rotation timer that tracks how long the Bluetooth slave SVDU 110 has not been continuously monitoring the first connection while monitoring the second or third connections, and controls (block 510) timing for when the Bluetooth slave SVDU 110 alternates back to monitoring the first connection responsive to the first rotation timer. The operations of blocks 505 10 can be similarly repeated to maintain rotation timers for each of the other connections. By way of example, the Bluetooth slave SVDU 110 can maintain a second rotation timer that tracks how long the Bluetooth slave SVDU 110 has not been continuously monitoring the second connection while monitoring the first or third connections, and control timing for when the Bluetooth slave SVDU 110 alternates back to monitoring the second connection responsive to the second rotation timer. Further, the Bluetooth slave SVDU 110 can maintain a third rotation timer that tracks how long the Bluetooth slave SVDU 110 has not been continuously monitoring the third connection while monitoring the first or second connections, and control timing for when the Bluetooth slave SVDU 110 alternates back to monitoring the third connection responsive to the third rotation timer.

A master Bluetooth transceiver (referred to as a "master" for brevity) schedules the transmission of a slave Bluetooth transceiver (each referred to as a "slave" for brevity) based on traffic demands to and the slave and any other slaves that may be sharing the channel. In addition, the master supports regular transmissions to keep the slave synchronized to the channel. The slave can listens in the master-to-slave slots for packets. From the type indication in the packet, the number of slots the master has reserved for its transmission can be derived; during this time, the slave does not have to listen on the master-to-slave slots. A periodic master transmission is required to keep the slave synchronized to the channel Since the slave only needs the channel access code to synchronize with, any packet type can be used for this purpose.

NULL packets can be sent by a master and used by the slave to maintain synchronization. The POLL packet can be similar to the NULL packet and it does not have a payload. In contrast to the NULL packet, the POLL packet requires a confirmation from the slave. Upon reception of a POLL packet the slave should respond with a packet. This return packet is an implicit acknowledgement of the POLL packet. The POLL packet can be used by the master in a piconet to poll the slave, which should then respond even if they does not have information to send.

When a connection between a master and slave device is established (connected mode), the master decides how often to synchronize with the slave. The slave cannot force the master to use a particular value, however in accordance with various embodiments herein, the slave sends a connection parameter update request packet that contains a timeout value which is requested that the master use to set how long the slave can be nonresponsive to POLL packets or other traffic from the master before the master tears down the connection to slave.

In some embodiments, the slave includes a connection interval and a slave latency in the connection parameter update request packet. The slave latency value defines the number of times that the slave can ignore a connection event transmitted by the master, before the master determines that the slave is no longer connected to the master and responsively tears down the connection to the slave. The slave latency value is an integer specifying the number of connection events that may be ignored. For example, the following code means that the slave can ignore four consecutive connection events, but must then return to the particular connection and service the fifth connection event:

define SLAVE_LATENCY 4 // four connection events can be ignored, the fifth must be responded to//

If there is no new data for the slave to transmit to the master, the slave can ignore the number of consecutive connection event specified by the slave latency value. During this period of time that the slave is ignoring connection events in a particular connection with one master, it alternates among other connections to service communications from other masters before returning to the particular connection.

In a further embodiment, the slave defines the timeout value communicated in the connection parameter update request packet, as a connection supervision timeout value that defines the time that the master will wait for a data transfer from the slave before assuming that the connection to the slave has been lost.

Figure 6:
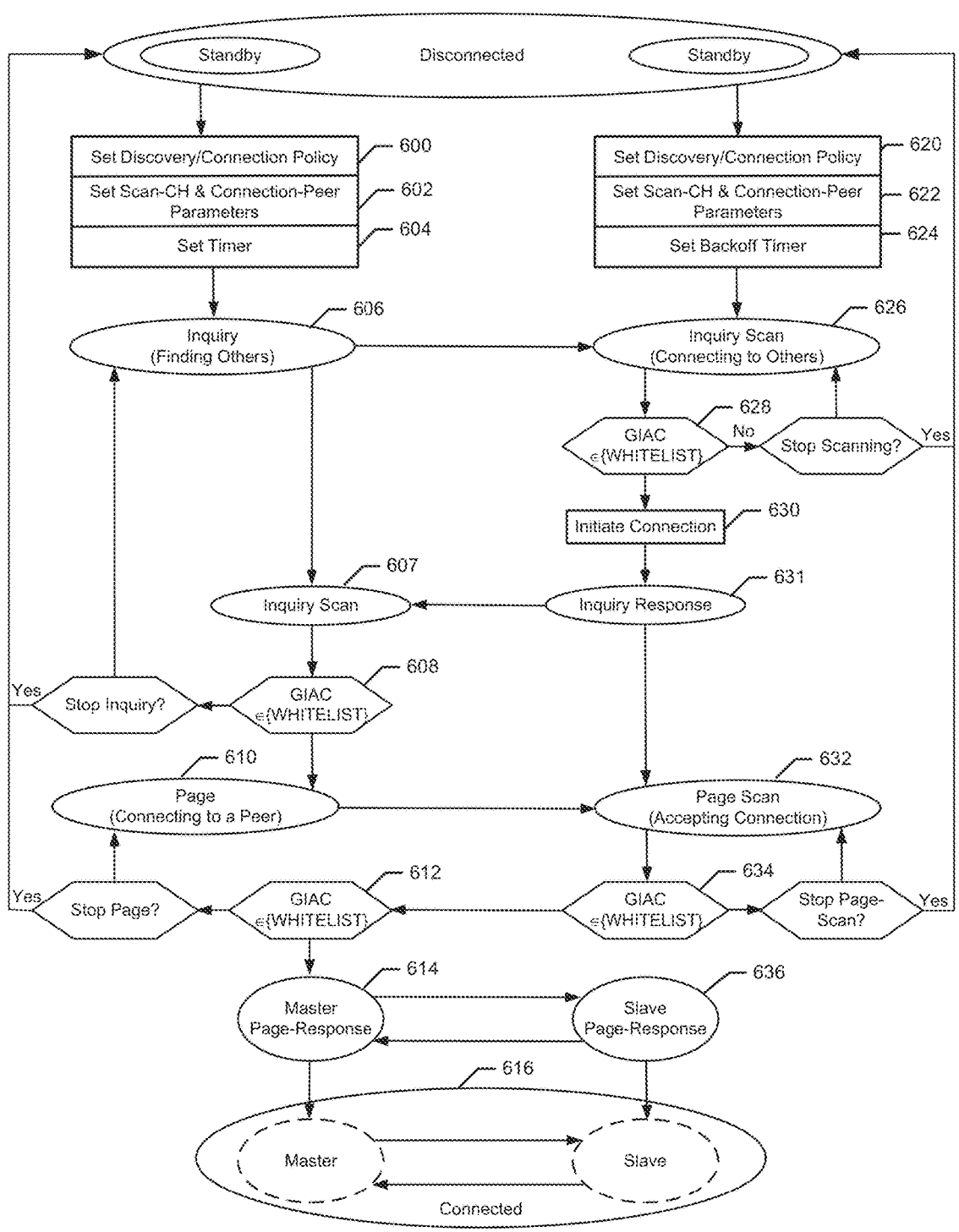
FIG. 6 illustrates Bluetooth discovery and connection operations with a whitelist and channel-map in accordance with some embodiments of the present disclosure.

FIG. 6 illustrates Bluetooth discovery and connection operations with a whitelist and channel-map in accordance with some embodiments of the present disclosure. Referring to FIG. 6, a Bluetooth transceiver in, for example, a passenger's wireless headphones, can transition from Standby state to set discovery/connection policy 600, and set scan channels (CH) and connection-peer parameters 602. The Bluetooth transceiver set a timer 604, and performs inquiry operations 606 to find other Bluetooth transceivers. For Bluetooth Classic (BLC), the inquiry can use 32 inquiry channels to send INQUIRY messages to reach an INQUIRY_SCAN device in 1 of the 32 inquiry channels. An inquiry scan 607 in BLC can involve hopping to a single frequency from the 16, to listen long enough for an inquiring device to cover 16 frequencies. The transceiver responds to an INQUIRY message by sending an INQUIRY response. The inquiry scan generates a list of General/Unlimited Inquiry Access Codes (GIACs) for discovered devices, which is filtered based on a whitelist 608 with only the GIACs contained in the whitelist being allowed for connection. The Bluetooth transceiver performs paging 610 to initiate connection to a peer Bluetooth transceiver among the GIACs in the whitelist 608.

In parallel operations, another Bluetooth transceiver in a SVDU can transition from Standby state to set discovery/connection policy 620, and set scan channels (CH) and connection-peer parameters 622. The Bluetooth transceiver set a backoff timer 624, and performs inquiry scan operations 626 to find other Bluetooth transceivers. The inquiry scan generates a list of General/Unlimited Inquiry Access Codes (GIACs) for discovered devices, which is filtered based on a whitelist 628 with only the GIACs contained in the whitelist being allowed for connection. The Bluetooth transceiver sends an inquiry response 631 to the other Bluetooth transceiver that identifies the channel and an access code for use in connecting to the Bluetooth transceiver.

The Bluetooth transceiver performs page scanning 632 to accept connection to the other (peer) Bluetooth transceiver, which is confirmed as being among the GIACs in the whitelist 634 and 612 by both Bluetooth transceivers.

The Bluetooth transceiver in the headphones provides a master page-response 614, which is answered as a slave page-response 636 by the Bluetooth transceiver in the SVDU. The Bluetooth transceiver in the headphones then operates in a master connected mode for communications with the SVDU, while the Bluetooth transceiver in the SVDU operates in a slave connected mode for communications with the headphones.

In BLC, the connection process requires messaging between the master and slave that includes the following. Similar to INQUIRY messages sent on 2 frequency trains of 16 frequencies, the initiator sends a PAGE requesting connection with target device . . . , upon target device receiving a PAGE-RESPONSE, it proceeds to next step. In the page response, an acknowledgement is sent back to the MASTER containing the SLAVE ID. Upon the MASTER receiving response, it stops frequency hopping generator & sends an FHS packet to the SLAVE. The hopping sequence is determined by the hop-set generator uses 28 bits of the MASTER's device address & 27 bits of MASTER's clock value (thus repetition interval of the sequence is 2^27, i.e. more than 23 Hrs). The newly generated hop sequence has low correlation with others & sweeps across all available frequencies with equal probability.

The SLAVE sends a response based on its native clock . . . , using the data from the FHS packet, the SLAVE calculates adopts the MASTER's frequency hopping pattern & synchronizes to its clock. When the MASTER receives the packet, it assigns the SLAVE an Active-Member-Address for the piconet & hops to the new frequency. The MASTER sends a POLL to check whether the SLAVE is on the same frequency . . . , upon receiving the POLL, to signal MASTER to be on the same channel, SLAVE sends a packet (usually a NULL packet) within a specified timeout period . . . , the two devices have formed a MASTER/SLAVE relationship & are connected. By configuring POLL response time in to be long, the MASTER/SLAVE device can preserve connection for considerably LONG times.

In Bluetooth Low Energy (BLE), a connection is formed by advertisement and scan processes that include the following. A BLE advertiser continuously sends advertising PDUs in advertising events composed of one or more advertising PDUs, broadcasting on three advertising channels, i.e., channel 37, 38 & 39. There are two kinds of Advertising Events in BLE Undirected Advertising & Directed Advertising events. The Undirected Advertising Event contains ADV_IND, ADV_NONCONN_IND, or ADV_SCAN_IND PDUs, which are used for detecting unknown device yet allows different responses. The time between the starts of two consecutive ADV-EVENT is the sum of ADV-INTERVAL & ADV-DELAY, ADV-INTERVAL is Rand[3, 16384]×625 uS, ranging from 20 mS to 10.24S. ADV_DELAY is a random, RAND[0, 1024]×625 uS, ranging from 0-10 mS generated by Link Layer for each event.

Simultaneously, a BLE scanner/initiator scans these advertising channels for a SCAN-WINDOW time during SCAN-INTERVAL Upon receiving an ADVERTISEMENT packet in a advertising channel, the scanner/initiator will send back a response. For example, a scanner sends SCAN_REQ to the advertiser asking for more information, or an initiator sends CONN_REQ to establish a connection—the response types are determined by the receiver role & type of advertising event.

Disconnection of a connection is performed responsive to any of: 1) Connection-Establishment Failure—when connection request doesn't reach advertiser or if advertiser rejects it; 2) voluntary termination, where a peer may self-determine to terminate connection by sending LL_TERMINATE_IND PDU; and 3) Connection Timeout—for when connected peer fails to ACK or send any data within connection timeout period.

Figure 7:
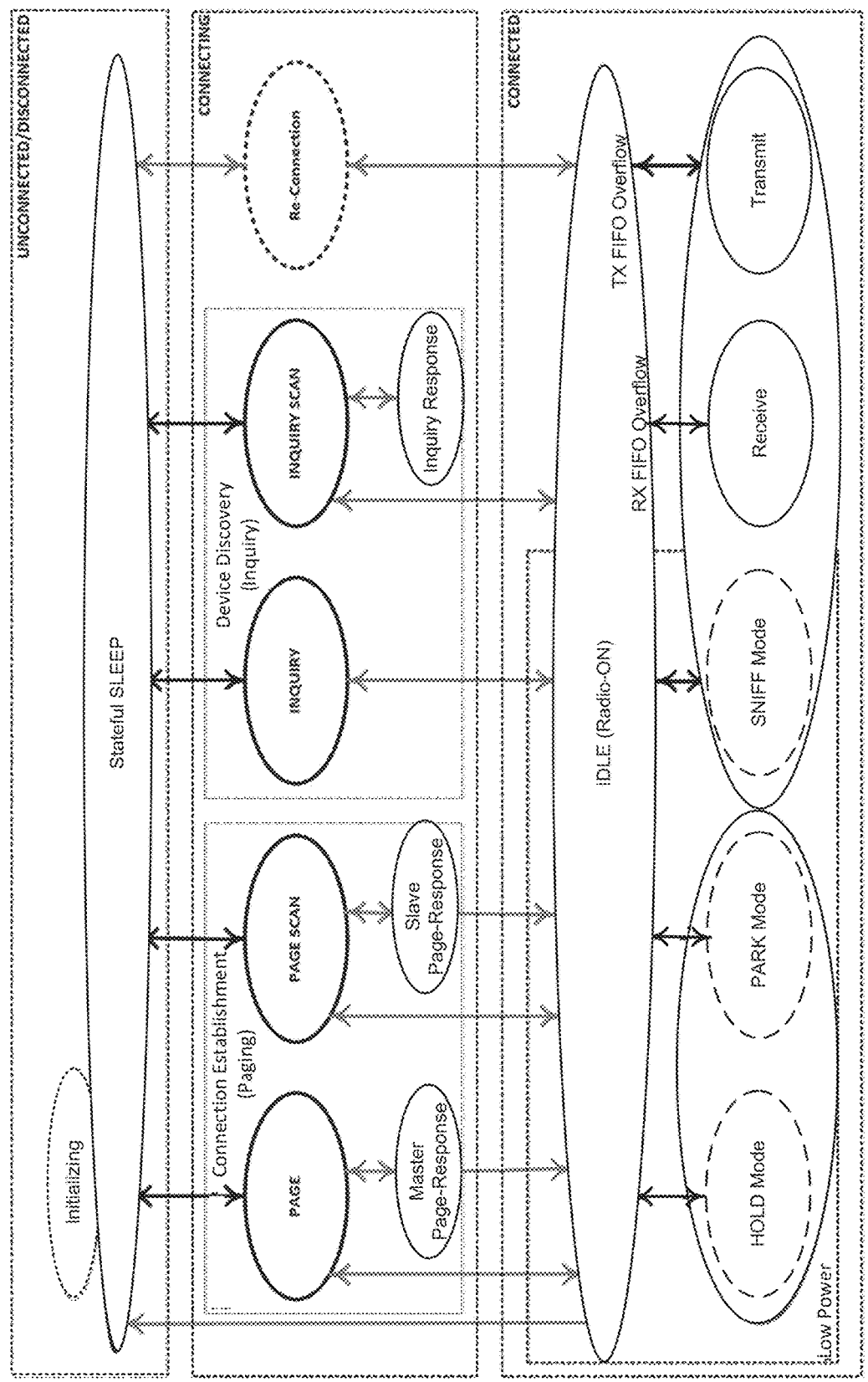
FIG. 7 is a flowchart and data flow diagram for various operational states of Bluetooth transceivers in the Bluetooth devices of the system of FIGS. 1-6 in accordance with some embodiments of the present disclosure.

FIG. 7 is a flowchart and data flow diagram for various operational states of Bluetooth transceivers in the Bluetooth devices (e.g., SVDU 110, WPCU 206, headphones 202, terminal 200, etc.) of the system of FIGS. 1-6 in accordance with some embodiments of the present disclosure.

Referring to FIG. 7, the type of operations performed by a Bluetooth transceiver depends upon the state of the Bluetooth transceiver's connection, which include includes: unconnected/disconnected; connecting; and connected. In the unconnected/disconnected state, the Bluetooth transceiver can operate in a statefull sleep operational mode, which is a lower power mode. In the connecting state, the Bluetooth transceiver operates to perform connection establishment (paging), device discovery (inquiry), and/or reconnection responsive to a lost connection. Connection establishment operations can include performing paging and paging scan. Device discovery operations can include performing inquiry and inquiry scan.

In the connected state, the Bluetooth transceiver performs idle operations (radio-on) while waiting for data to be received (via an antenna) into the receive FIFO buffer and waiting for data to be input to the transmit FIFO buffer awaiting transmission through the antenna. The Bluetooth transceiver also performs hold mode operations, Park mode operations, sniff mode operations, operations to receive data through the antenna into the receive FIFO buffer (e.g., for output to the processor of the Bluetooth device), and operations to transmit data that has been input to the transmit FIFO buffer (e.g. by the processor of the Bluetooth device) for transmission through the antenna.

Figure 8:
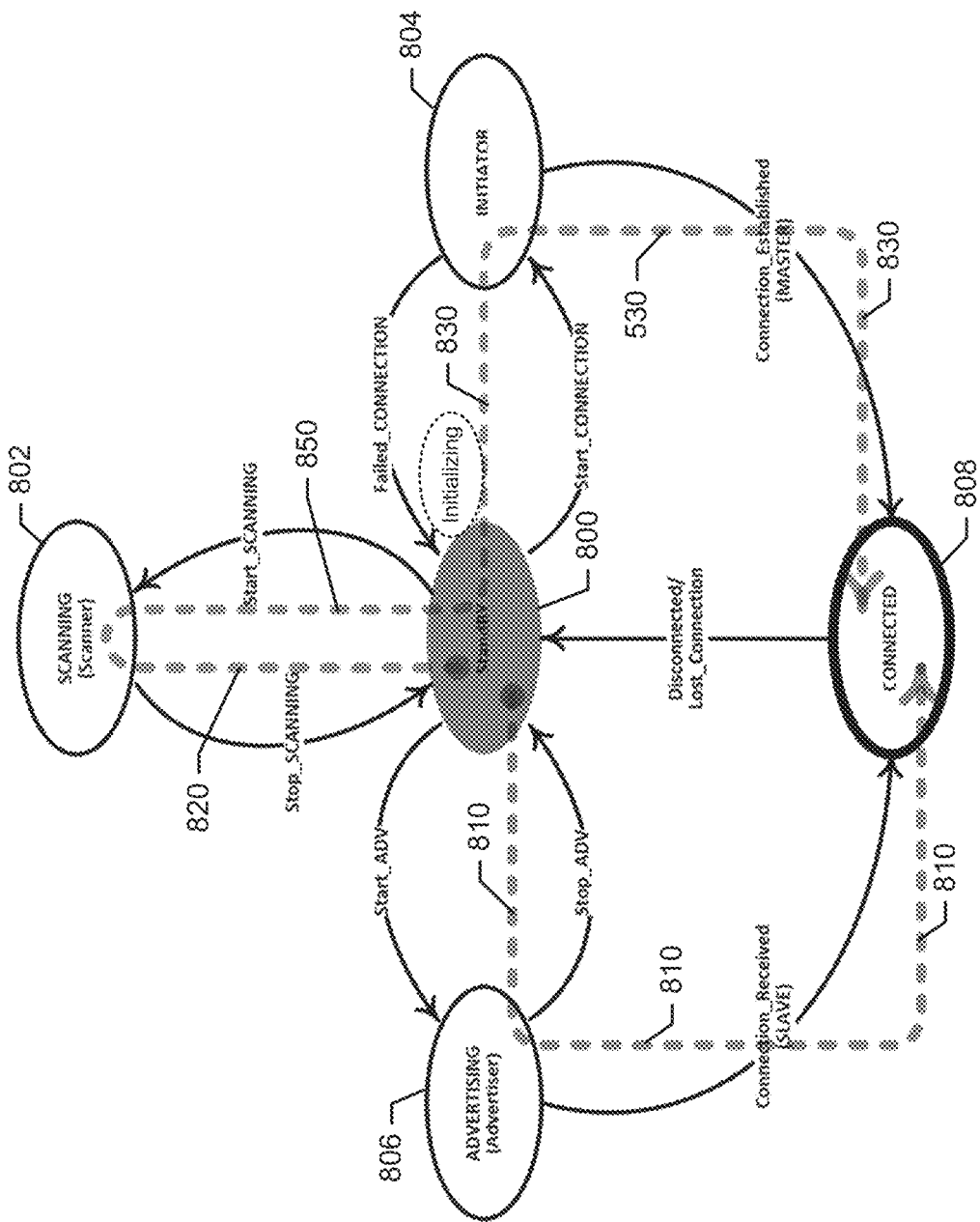
FIG. 8 is a state diagram for various operational states of Bluetooth transceivers in the Bluetooth devices of the system of FIGS. 1-7 in accordance with some embodiments of the present disclosure.

FIG. 8 is a state diagram for various operational states of Bluetooth transceivers devices (e.g., SVDU 110, WPCU 206, headphones 202, terminal 200, etc.) of the system of FIGS. 1-7 in accordance with some embodiments of the present disclosure. Referring to FIG. 7, a Bluetooth transceiver can perform operations corresponding to the standby state 800, scanning state 802, initiator state 804, advertising state 806, and connected state 808. A Bluetooth transceiver can lose its Bluetooth connection to another device. FIG. 8 illustrates the state transitions 830 of a Bluetooth transceiver operating as a master device and further illustrates the state transitions 810 of another Bluetooth transceiver operating as a slave device, according to various embodiments herein.

Example Slave and Master Bluetooth Devices

Figure 9:
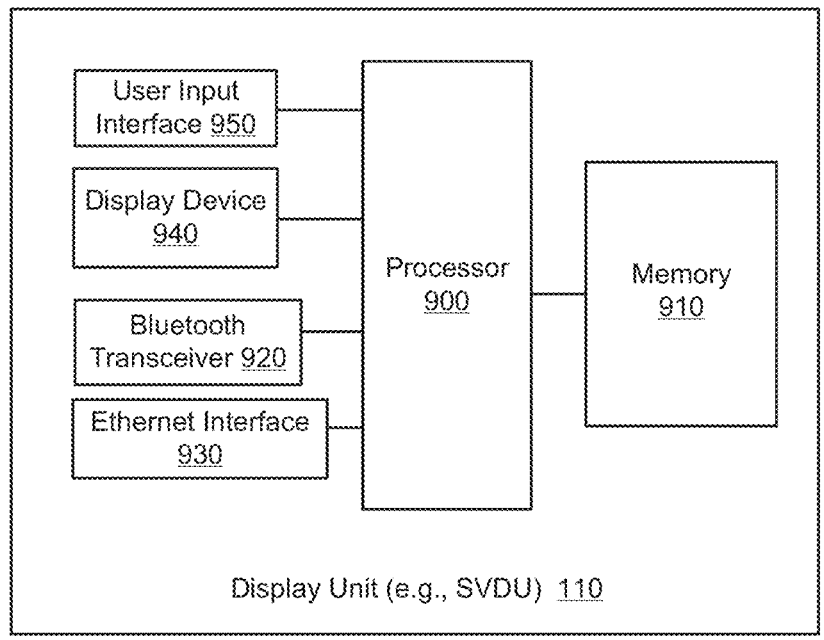
FIG. 9 is a block diagram of a display unit configured to operate in accordance with some embodiments of the present disclosure.

FIG. 9 is a block diagram of a display unit, such as the SVDU 110, that is configured to operate in accordance with some embodiments of the present disclosure. The display unit includes at least one processor circuit 900 (referred to as a processor for brevity), at least one memory circuit 910 (referred to as a memory for brevity), a Bluetooth transceiver 920, and a display device 940 (e.g., graphical display device that may include a touch sensitive display). The display unit may further include a user input interface 950 (e.g., keypad, buttons, touch sensitive interface, etc.) and/or an Ethernet or other wired network interface 930.

The processor 900 may include one or more data processing circuits, such as a general purpose and/or special purpose processor (e.g., microprocessor and/or digital signal processor) that may be collocated or distributed across one or more networks. The processor 900 is configured to execute computer program code in the memory 910, described below as a non-transitory computer readable medium, to perform at least some of the operations described herein as being performed by a display unit, such as a SVDU, or by any other device that operates in a Bluetooth slave mode. The computer program code when executed by the processor 900 causes the processor 900 to perform operations in accordance with one or more embodiments disclosed herein for the display units disclosed herein. The processor 900 controls what content is played (e.g., television shows, movies), displayed (e.g., electronic books), executed (e.g., gaming programs), and/or otherwise consumed through the display unit responsive to commands received through the Bluetooth transceiver 920 via connections that have been established with various other devices operating in a Bluetooth master mode.

Figure 10:
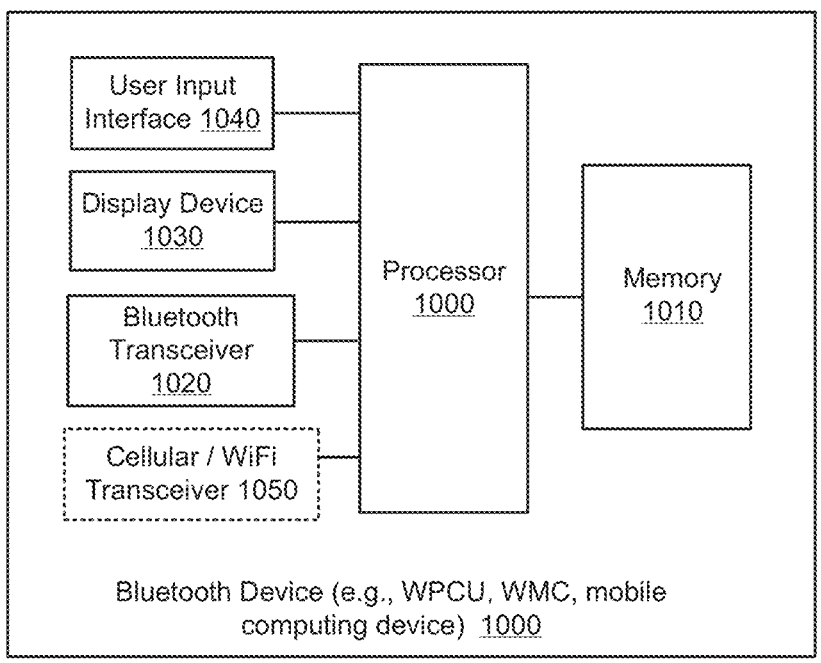
FIG. 10 is a block diagram of a Bluetooth device configured to operate in accordance with some embodiments of the present disclosure.

FIG. 10 is a block diagram of a Bluetooth device 1000, such as one of the various WPCU, WMC, mobile computing device (wireless headphones, passenger terminal, etc.) disclosed herein, configured to operate in accordance with some embodiments of the present disclosure. The Bluetooth device 1000 includes at least one processor circuit 1000 (referred to as a processor for brevity), at least one memory circuit 1010 (referred to as a memory for brevity), and a Bluetooth transceiver 1020. The Bluetooth device 1000 may further include a display device 1030 (e.g., graphical display device that may include a touch sensitive display), a user input interface 1040 (e.g., keypad, buttons, touch sensitive interface, etc.), and/or a cellular and/or Wi-Fi transceiver 1050.

The processor 1000 may include one or more data processing circuits, such as a general purpose and/or special purpose processor (e.g., microprocessor and/or digital signal processor) that may be collocated or distributed across one or more networks. The processor 1000 is configured to execute computer program code in the memory 1010, described below as a non-transitory computer readable medium, to perform at least some of the operations described herein as being performed by a Bluetooth device that is operating in a master Bluetooth mode. The computer program code when executed by the processor 1000 causes the processor 1000 to perform operations in accordance with one or more embodiments disclosed herein for the display units disclosed herein.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A slave Bluetooth device comprising:
   at least one processor; and
   at least one memory connected to the at least one processor and storing program code that is executed by the at least one processor to perform operations comprising:
      establishing a first connection with a first master Bluetooth device that operates in a master mode, wherein the slave Bluetooth device operates in a slave mode when communicating through the first connection with the first master Bluetooth device;
      communicating a first connection parameter update request packet containing a first timeout value through the first connection toward the first master Bluetooth device; and
      establishing a second connection with a second master Bluetooth device that operates in a master mode, wherein the slave Bluetooth device operates in the slave mode when communicating through the second connection with the second master Bluetooth device;
      communicating a second connection parameter update request packet containing a second timeout value through the second connection toward the second master Bluetooth device; and
      alternating during non-overlapping time slots between at least: 1) monitoring the first connection for traffic transmitted by the first master Bluetooth device while not monitoring the second connection; and 2) monitoring the second connection for traffic transmitted by the second master Bluetooth device while not monitoring the first connection; and
      controlling a rate at which the alternating is performed based on at least one of the first timeout value and the second timeout value.

2. The slave Bluetooth device of claim 1, wherein controlling the rate at which the alternating is performed based on the at least one of the first timeout value and the second timeout value, comprises:
   controlling the slave Bluetooth device to cease monitoring the first connection and to resume monitoring the second connection, based on expiration of a first time slot during the monitoring of the first connection, the first time slot is defined based on the first timeout value; and
   controlling the slave Bluetooth device to cease monitoring the second connection and to resume monitoring the first connection, based on expiration of a second time slot during the monitoring of the second connection, the second time slot is defined based on the second timeout value.

3. The slave Bluetooth device of claim 1, wherein:
   the first timeout value is the same as the second timeout value.

4. The slave Bluetooth device of claim 1, wherein the operations further comprise:
   determining the first timeout value based on a maximum length of time that the slave Bluetooth device is allowed to remain not monitoring the first connection while it monitors at least the second connection.

5. The slave Bluetooth device of claim 4, wherein the operations further comprise:
   determining the second timeout value based on a maximum length of time that the slave Bluetooth device is allowed to remain not monitoring the second connection while it monitors at least the first connection.

6. The slave Bluetooth device of claim 5, wherein the operations further comprise:
   sequentially and separately establishing a further connection with each of a plurality of other master Bluetooth devices that each operates in a master mode, wherein the slave Bluetooth device operates in the slave mode when communicating through any of the further connections;
   responsive to each establishment of one of the further connections with one of the other master Bluetooth devices, performing operations to:
      determine a further timeout value based on a maximum length of time that the slave Bluetooth device is allowed to remain not monitoring the one of the further connections with the one of the other master Bluetooth devices while it alternates between monitoring other connections that have been established; and
      communicate a further connection parameter update request packet containing the further timeout value through the one of the further connections to the one of the other master Bluetooth devices; and
   the alternating during the non-overlapping time slots is between each of the first, second, and the further connections.

7. The slave Bluetooth device of claim 1, further comprising:
   a video display unit of a vehicle electronic system that has electronically integrated therein the slave Bluetooth device and a display device that controls what content is displayed responsive to at least some of the traffic that is received through each of the first and second connections, wherein the video display unit is configured to be mechanically connected to a frame within a vehicle.

8. The slave Bluetooth device of claim 7, wherein:
   the first connection is established with a wireless passenger control unit (WPCU) device having an interface that is operable by a passenger supported by a seat frame connected to the SVDU; and
   the second connection is established with a passenger mobile computing device that is operable by the passenger supported by the seat frame connected to the SVDU.

9. The slave Bluetooth device of claim 1, wherein the operations further comprise:
   determining the first timeout value based on a rate at which traffic is expected to be transmitted through the first connection by the first master Bluetooth device; and
   determining the second timeout value based on a rate at which traffic is expected to be transmitted through the second connection by the second master Bluetooth device.

10. The slave Bluetooth device of claim 9, wherein the operations further comprise:
    further determining the first timeout value based on a combination of the rate at which traffic is expected to be transmitted through the first connection by the first master Bluetooth device and the rate at which traffic is expected to be transmitted through the second connection by the second master Bluetooth device; and
    further determining the second timeout value based on a combination of the rate at which traffic is expected to be transmitted through the second connection by the second master Bluetooth device and the rate at which traffic is expected to be transmitted through the first connection by the first master Bluetooth device.

11. The slave Bluetooth device of claim 1, wherein the operations further comprise:
generating the first timeout value as a first slave latency value that defines a maximum number of polling requests transmitted by the first master Bluetooth device through the first connection that the slave Bluetooth device can ignore without sending an acknowledgement response to the first master Bluetooth device before triggering the first master Bluetooth device to tear down the first connection; and
generating the second timeout value as a second slave latency value that defines a maximum number of polling requests transmitted by the second master Bluetooth device through the second connection that the slave Bluetooth device can ignore without sending an acknowledgement response to the second master Bluetooth device before triggering the second master Bluetooth device to tear down the second connection.

12. The slave Bluetooth device of claim 11, wherein:
while monitoring the first connection for traffic transmitted by the first master Bluetooth device, communicating connection polling responses through the first connection responsive to corresponding connection polling requests that are received through the first connection; and
while monitoring the second connection for traffic transmitted by the second master Bluetooth device, communicating connection polling responses through the second connection responsive to corresponding connection polling requests that are received through the second connection.

13. The slave Bluetooth device of claim 1, wherein the operations further comprise:
generating the first connection parameter update request packet to contain the first timeout value and to further contain a first connection interval value that is determined based on a maximum length of time that the slave Bluetooth device is allowed to remain not monitoring the first connection while it monitors at least the second connection; and
generating the second connection parameter update request packet to contain the second timeout value and to further contain a second connection interval value that is determined based on a maximum length of time that the slave Bluetooth device is allowed to remain not monitoring the second connection while it monitors at least the first connection.

14. The slave Bluetooth device of claim 1, wherein the operations further comprise:
maintaining a first rotation timer that tracks how long the slave Bluetooth device has not been continuously monitoring the first connection while monitoring the second connection any other connection with any one or more other master Bluetooth devices;
controlling timing for when the slave Bluetooth device alternates back to monitoring the first connection responsive to the first rotation timer;
maintaining a second rotation timer that tracks how long the slave Bluetooth device has not been continuously monitoring the second connection while monitoring the first connection any other connection with any one or more other master Bluetooth devices; and
controlling timing for when the slave Bluetooth device alternates back to monitoring the second connection responsive to the second rotation timer.

15. An electronic system comprising:
a Bluetooth transceiver;
at least one processor connected to the Bluetooth transceiver; and
at least one memory connected to the at least one processor and storing program code that is executed by the at least one processor to perform operations comprising:
establishing a first connection through the Bluetooth transceiver with a first master Bluetooth device that operates in a master mode, wherein the Bluetooth transceiver operates in a slave mode when communicating through the first connection;
communicating a first connection parameter update request packet containing a first timeout value through the Bluetooth transceiver and the first connection to the first master Bluetooth device; and
establishing a second connection through the Bluetooth transceiver with a second master Bluetooth device that operates in a master mode, wherein the Bluetooth transceiver operates in the slave mode when communicating through the second connection;
communicating a second connection parameter update request packet containing a second timeout value through the Bluetooth transceiver and the second connection to the second master Bluetooth device; and
alternating during non-overlapping time slots between at least: 1) monitoring the first connection for traffic transmitted by the first master Bluetooth device while not monitoring the second connection; and 2) monitoring the second connection for traffic transmitted by the second master Bluetooth device while not monitoring the first connection; and
controlling a rate at which the alternating is performed based on the first timeout value and the second timeout value.

16. The electronic system of claim 15, further comprising:
determining the first timeout value based on a maximum length of time that the Bluetooth transceiver is allowed to remain not monitoring the first connection while it monitors at least the second connection; and
determining the second timeout value based on a maximum length of time that the Bluetooth transceiver is allowed to remain not monitoring the second connection while it monitors at least the first connection,
wherein controlling the rate at which the alternating is performed based on the first timeout value and the second timeout value, comprises:
controlling the Bluetooth transceiver to cease monitoring the first connection and to resume monitoring the second connection, based on expiration of a first time slot during the monitoring of the first connection, the first time slot is defined based on the first timeout value; and
controlling the Bluetooth transceiver to cease monitoring the second connection and to resume monitoring the first connection, based on expiration of a second time slot during the monitoring of the second connection, the second time slot is defined based on the second timeout value.

17. The video display unit of claim 15, wherein the operations further comprise:
generating the first timeout value as a first slave latency value that defines a maximum number of polling requests transmitted by the first master Bluetooth device through the first connection that the Bluetooth transceiver can ignore without sending an acknowledgement response to the first master Bluetooth device before triggering the first master Bluetooth device to tear down the first connection; and generating the second timeout value as a second slave latency value that defines a maximum number of polling requests transmitted by the second master Bluetooth device through the second connection that the Bluetooth transceiver can ignore without sending an acknowledgement response to the second master Bluetooth device before triggering the second master Bluetooth device to tear down the second connection.

18. The video display unit of claim 17, wherein:

while monitoring the first connection for traffic transmitted by the first master Bluetooth device, communicating connection polling responses through the first connection responsive to corresponding connection polling requests that are received through the first connection; and while monitoring the second connection for traffic transmitted by the second master Bluetooth device, communicating connection polling responses through the second connection responsive to corresponding connection polling requests that are received through the second connection.

19. A method of operating a slave Bluetooth device, the method comprising:

establishing a first connection with a first master Bluetooth device that operates in a master mode, wherein the slave Bluetooth device operates in a slave mode when communicating through the first connection with the first master Bluetooth device;

communicating a first connection parameter update request packet containing a first timeout value through the first connection toward the first master Bluetooth device; and establishing a second connection with a second master Bluetooth device that operates in a master mode, wherein the slave Bluetooth device operates in the slave mode when communicating through the second connection with the second master Bluetooth device;

communicating a second connection parameter update request packet containing a second timeout value through the second connection toward the second master Bluetooth device; and alternating during non-overlapping time slots between at least: 1) monitoring the first connection for traffic transmitted by the first master Bluetooth device while not monitoring the second connection; and 2) monitoring the second connection for traffic transmitted by the second master Bluetooth device while not monitoring the first connection; and controlling a rate at which the alternating is performed based on at least one of the first timeout value and the second timeout value.

20. The method of claim 19, further comprising:

determining the first timeout value based on a maximum length of time that the slave Bluetooth device is allowed to remain not monitoring the first connection while it monitors at least the second connection; and determining the second timeout value based on a maximum length of time that the slave Bluetooth device is allowed to remain not monitoring the second connection while it monitors at least the first connection, wherein controlling the rate at which the alternating is performed based on the first timeout value and the second timeout value, comprises:

controlling the slave Bluetooth device to cease monitoring the first connection and to resume monitoring the second connection, based on expiration of a first time slot during the monitoring of the first connection, the first time slot is defined based on the first timeout value; and controlling the slave Bluetooth device to cease monitoring the second connection and to resume monitoring the first connection, based on expiration of a second time slot during the monitoring of the second connection, the second time slot is defined based on the second timeout value.

21. The method of claim 19, wherein the operations further comprise:

generating the first timeout value as a first slave latency value that defines a maximum number of polling requests transmitted by the first master Bluetooth device through the first connection that the slave Bluetooth device can ignore without sending an acknowledgement response to the first master Bluetooth device before triggering the first master Bluetooth device to tear down the first connection; and generating the second timeout value as a second slave latency value that defines a maximum number of polling requests transmitted by the second master Bluetooth device through the second connection that the slave Bluetooth device can ignore without sending an acknowledgement response to the second master Bluetooth device before triggering the second master Bluetooth device to tear down the second connection.

* * * * *